United States Patent [19]
Freeman et al.

[11] Patent Number: 5,349,394
[45] Date of Patent: Sep. 20, 1994

[54] RIGID GAS PERMEABLE LENSES

[75] Inventors: Michael H. Freeman, Denbigh, United Kingdom; William E. Meyers, San Ramon, Calif.

[73] Assignee: Pilkington Diffractive Lenses Limited, St. Helens, United Kingdom

[21] Appl. No.: 684,322

[22] Filed: Apr. 12, 1991

[30] Foreign Application Priority Data

Apr. 17, 1990 [GB] United Kingdom ............... 9008577.0

[51] Int. Cl.⁵ .......................... G02C 7/04; G02B 27/44
[52] U.S. Cl. ................................ 351/160 R; 351/161; 351/177; 351/247; 359/565; 359/566
[58] Field of Search ............... 351/160 R, 160 H, 161, 351/162, 177, 247; 359/565, 566

[56] References Cited

U.S. PATENT DOCUMENTS 4,881,804  11/1989  Cohen ................................. 351/161

FOREIGN PATENT DOCUMENTS 0064812  11/1982  European Pat. Off. .
0109753  5/1984  European Pat. Off. .

*Primary Examiner*—Scott J. Sugarman
*Attorney, Agent, or Firm*—Burns, Doane, Swecker & Mathis

[57] ABSTRACT

A method of fitting rigid gas permeable contact lenses comprising the steps of:
  providing a set of lenses of differing BCOR values, but the same optical corrective power;
  fitting a patient with a lens to determine an acceptable BCOR value for the patient;
  determining the corrective prescription for that patient; and
  supplying the patient with a lens having an acceptable BCOR value and the correct prescription.

The lens supplied is manufactured in the same geometry and fitting characteristics as the lens from the set used in fitting and adjusted to the correct prescription power from the fixed power by diffractive means.

12 Claims, 1 Drawing Sheet

RIGID GAS PERMEABLE LENSES

This invention relates to a method of fitting patients with rigid gas permeable lenses, and sets of lenses for supply to such patients.

Rigid gas permeable contact lenses require fitting on the eye, and a range of lens shapes are available the size and shape of which are defined by a BCOR value. The BCOR value (on Back Surface Central Optical Radius) is the distance from the rear surface of the lens to the centre of curvature of that, usually spherical, surface.

In addition to fitting patients with lenses, which comfortably locate on the eyes, it is necessary to determine their individual prescription. This is usually done by fitting a lens from a fitting set of a particular power and then determining what change in power is required to correct the vision of the patient. This is done by adding spectacle lenses in a temporary trial frame worn for this purpose. The power of the spectacle lenses needed (the over-refraction), plus the intrinsic power of the contact lens from the fitting set, is essentially the optical corrective power needed in the contact lens to be dispensed to the patient. It is not possible for the fitter to carry a range of all possible prescription lenses, and hence these are provided by a wholesaler, or by producing a lens to the individual prescription order. The problem which faces the fitter is that while a lens from the fitting set may be comfortable on the patient's eye, the change in shape necessary to give a lens the desired prescription may make the lens an unsatisfactory fit. The lens must then be returned and a further attempt made to fit the patient thus delaying fulfilling the prescription. We have now found that this problem can be avoided.

According to the present invention there is provided a method of fitting rigid gas permeable contact lenses to prescription, comprising the steps of (1) providing a set of lenses of differing BCOR values, but the same optical corrective power, (2) fitting a patient with a lens so as to determine an acceptable BCOR value, (3) determining the corrective optical prescription required for that patient and (4) supplying the patient with a lens having the acceptable BCOR value, and the correct prescription, the lens supplied having been manufactured in the same geometry and fitting characteristics as the lens from the set used in fitting, and adjusted to the correct prescription power from the basic power by diffractive means.

In accordance with a second aspect of the present invention a method of fitting rigid gas permeable contact lenses to prescription, comprises (1) using a set of lenses of differing BCOR valves but identical optical corrective powers to determine which lens from the set is most comfortable to the patient, (2) determining the optical power adjustment to the lens from the set of lenses required to correct for the prescription for the patient and (3) using an identical lens to the lens selected from the set of lenses and providing diffractive means to adjust the optical corrective power to be correct for the patient.

Preferably, the diffractive means provides a positive optical power to add to the base refractive power of the lens.

Alternatively, the diffractive means provides a negative optical power to subtract from the base refractive power of the lens.

This present invention is directed primarily to the fitting of rigid gas permeable (RGP) lenses because of the need to simplify the fitting of such lenses and reduce the possibility of a lens supplied being returned as unsatisfactory. RGP lenses are manufactured and stocked in a range of sizes based on the following parameters:

Base Curve: from about 7.20 to 8.60 mm, with some special purpose lenses e.g. KERATOCONIC lenses may be between 5 to 6 mm in radius.
Posterior Peripheral the peripheral curve is chosen to
Curves: provide a particular degree of edge lift and is usually between about 0.08 and 0.12.
Lens Diameter: usually between 8.0 and 10 mm.
Power: The full range to correct refractive error is from +20D to −20D.

Satisfactory wearing characteristics for a lens on an eye are obtained by choosing the lens geometry which provides the best mechanical performance, including centration, movement, comfort, tears exchange, oxygen transmission, and flexure for a particular patient.

However, as will be well appreciated the optimum mechanical geometry may not be obtainable at the desired power, and some compromise in the wearing characteristics may have to be made.

By using a standard set of lenses with identical optical corrective powers for each lens in the set but differing BCOR values for fitting or two half sets with identical optical corrective power within each half set e.g. a complete series comprising a plus halfset of say +3.00 Dioptres, and a negative halfset of −3.00 Dioptres, the correct fitting for the patient and the correct prescription can be easily determined, and the supply of a prescription set of lens is then relatively easy. The lens is taken from a stock of lenses having the same geometry and wearing characteristics as the set identified during fitting, so that it is of the same geometry and wearing characteristics as the selected lens of the set, and the diffractive power is added.

In practice the contact lenses are manufactured in two stages. Firstly the lenses are produced identical to the set lenses used in the fitting in all respects, including optical corrective power, and then they are adjusted to other optical corrective power values by using a diffractive power component equal to the adjustment identified as necessary during fitting. For example, a lens with a refractive power determined by its geometry of −3.00 Dioptres can be supplied as a lens of −2.25 Dioptres power because it also has diffractive power of +0.75 Dioptres. The provision of diffractive power to the lens does not alter the geometrical shape of the supplied lens, therefore the prescription lens will fit the eye in exactly the same way as the lens from the set used during fitting. This will be the case no matter what diffractive power component was provided to the lens. It is utilisation of this aspect which enables the present invention to work.

In a preferred embodiment of the present invention, for an overall positive power lens the refractive geometrical power of the set of lenses for fitting, is preferably, +3.00 Dioptres. Therefore, for example, if a +4.25 Dioptre lens were needed +1.25 Dioptres of diffractive power would need to be added to the basic refractive power.

In a preferred embodiment of the present invention, for an overall negative power lens the refractive geometrical power of the set of lenses for fitting is preferably −3.00 Dioptres.

Theoretically there is no limit to the amount of diffractive power which can be added to a lens without altering the actual geometry of the lens. For instance, a −3.00 Dioptre lens could be converted into a +3.00 Dioptre by adding +6.00 Dioptres of diffractive power. Nevertheless, for practical reasons and to limit the effect of the chromatic aberration associated with diffractive power, it is preferred that a 'negative' series and a 'positive' series be supplied.

Therefore, in a preferred embodiment of the present invention for an overall set of lenses a positive power and a negative power set of lenses are provided. Preferably these sets of lenses have a refractive geometrical power of +3.00 Dioptres and −3.00 Dioptres respectfully.

It has been found that in making RGP lenses in which the desired power is achieved by a combination of refractive and diffractive means, a performance is obtained which is virtually indistinguishable from the purely refractive geometry RGP lenses. However, it should be noted that lenses in which diffractive means are used to provide optical corrective power tend to have a level of light scattering which does not occur in refractive geometry RGP lenses and which may be apparent to someone used to refractive lenses. In order to produce a single vision RGP lens with a low level of scattering, we have found it preferable when machining the diffractive means onto the lens surface to use a "flatted diamond". This is a diamond tool which is shaped so that when the diamond is plunged into the surface to provide a diffractive zone, its trailing edge leaves a steep step with a gradient steeper than 45%.

The present invention also includes a single vision RGP lens in which the power of the lens is determined by a combination of basic refractive power arising from the shape, curvature and material of the lens, and diffractive power, the diffractive power being produced by cutting one of the lens surfaces so as to provide a diffractive means, such as an asymmetric zone plate, with steps on that surface, the cutting being carried out with a flatted diamond and the diffractive means being one in which the step heights when multiplied by the refractive index difference between the lens material and the tear film provide an optical path difference substantially equivalent to one wavelength of light close to the centre of the human visual response, or some integral multiple thereof.

The amount of scatter can be evaluated by assessing the visual quality of the lens through wearer trials. In such trials we have found that patients can distinguish between lenses which have a diffractive means cut using a flatted diamond, and those cut using a rounded diamond, and the level of scattering produced by diffractive means cut by a flattened diamond is less distracting in adverse conditions, such as at low light levels, than is presently available.

Our invention further includes, a set of rigid gas permeable contact lenses for use in supplying lenses to a patient's individual prescription, said set of lenses (the supply set) being manufactured so as to have available a range of fitting characteristics substantially the same as that available in a set of lenses (the fitting set) used in determining the patient's prescription, the supply set differing from the fitting set in that their overall power value is determined by a combination of basic refractive power arising from the shape, curvature and material of the lens, and diffractive power.

The invention will now be illustrated by way of description of an example of the present invention with reference to the accompanying drawings, in which.

Figure 1:
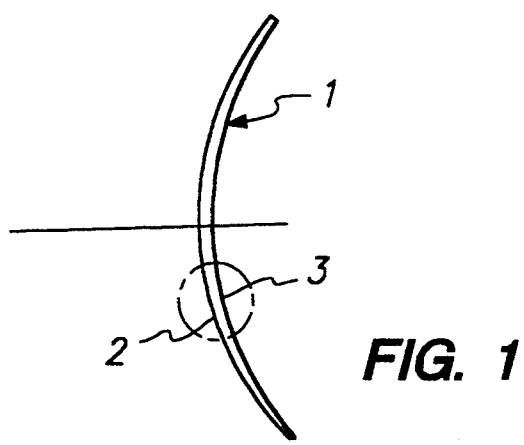
FIG. 1 shows a schematic cross-section of a contact lens suitable for use with the present invention.

Now referring to FIG. 1 of the accompanying drawings there is shown a schematic representation of a contact lens of the type which may be used in accordance with the present invention.

The contact lens 1 is manufactured from a material having a refractive index $R_n$, and has
a front curve 2, and—a base curve 3.

Figure 2:
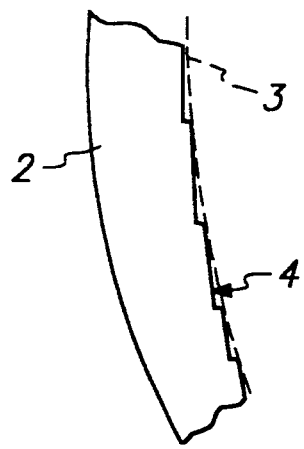
FIG. 2 shows an enlarged cross-section of a contact lens having a positive power diffractive suitable for use with the present invention.

Now referring to FIG. 2 of the accompanying drawings, there is shown a section of the contact lens 1 in which a diffractive power element 4 has been provided in the base curve 3. In this particular figure the diffractive power element is a kineform, in fact a positive power kineform.

Figure 3:
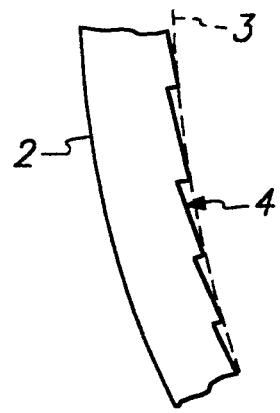
FIG. 3 shows an enlarged cross-section of a contact lens having negative diffractive power suitable for use with the present invention.

Now referring to FIG. 3 of the accompanying drawings, there is shown a section of the contact lens 1 in which a diffractive power element 4 has been provided in the base curve 3. In this particular figure the diffractive power element is a kineform, in fact a negative power kineform.

In a set of lenses provided to enable fitting to a wearer, all the individual lenses in the set are of the same basic form as shown in FIG. 1, and are either all of the same optical power or alternatively comprise two half sets, within each half set all the lenses being of the same optical power.

The lenses within the set, or half set, are purely refractive in operation, and each lens has a slight variation in the shaping of the base curve 3, which will be in contact with the eye.

In use the fitter tries the lenses in the set in the patients eye until he finds the lens with the base curve 3 having the most suitable/comfortable fit for the patient. Then in the normal fashion the fitter will determine the correct prescription for the patient, and consequently the adjustment from the lens in set required in the prescription.

As a consequence of this, a lens geometrically identical to the selected lens from the set is selected, and diffractive means is provided in the base curve 3 in order to correct the lens to the patients prescription.

The lens is then ready for wearing by the patient.

Normally, the fitter is provided with a set of lenses which comprises two half sets, a positive power half set of +3.00 Dioptres and a negative power half set of −3.00 Dioptres.

It will be understood that a supply set of lenses may be manufactured so as to have available a range of fitting characteristics substantially the same as that available in a fitting set of lenses which is used in determining the patient's prescription. The supply set differs from the fitting set in that the overall power of the supply set lenses is determined by a combination of basic refractive power (arising from the shape, curvature and material of the lens) and diffractive power whereas the fitting set lenses have only refractive power.

The diffractive power element is preferably produced by cutting the lens surface 3 with a flatted diamond to provide diffractive means, such as an asymmetric zone plate.

Figure 4:
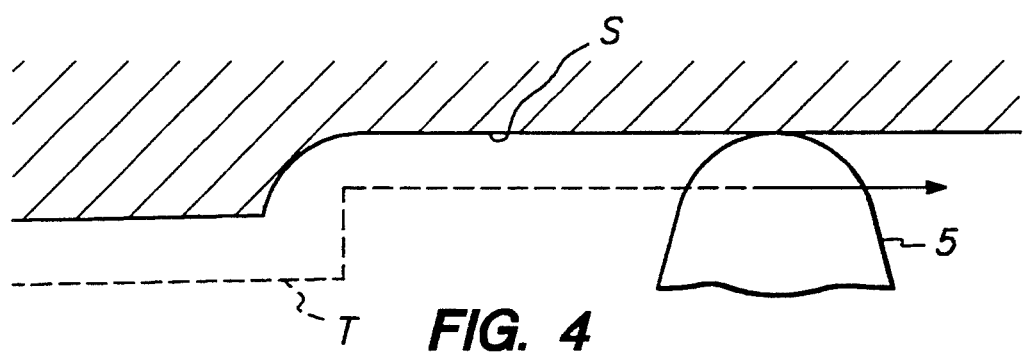
FIGS. 4 and 5 are schematic representations of diamond cutting techniques.
Figure 5:
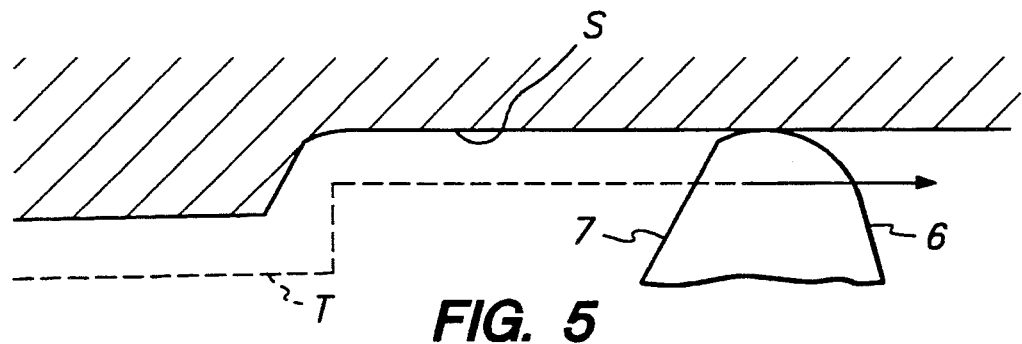

When a diamond is used to cut a diffractive optical surface the radius of the tip of the diamond has a limiting action on the detail which can be incorporated in the structure. With a large radius diamond tip wear is reduced but only smooth or slowly varying surface profiles can be cut. This is illustrated in FIG. 4 which shows a large radius round diamond 5 whose centre follows (moving from left to right) a track T to cut a step in a surface S. It will be seen that the resultant step riser is curved corresponding to the curvature of the diamond. Where sharper steps are required in the surface profile a very sharp diamond can be used but wear increases with a mope pointed tip. However, with the steps all facing in one direction, a flatted diamond of otherwise large radius can be employed. This is illustrated in FIG. 5 which shows a flatted diamond 6 basically of the same round form as the diamond 5 in FIG. 4 but with a flat 7 on its trailing side. The track T followed by its centre (moving from left to right) is essentially the same as in FIG. 4 but as the flatted diamond is pushed into the surface S a sharper profile step is produced by reason of the flat 7. Successive steps facing in the same direction can be produced correspondingly by pushing the diamond tip into the surface at each step position. To cut a surface of the opposite hand, i.e. with oppositely facing steps, a diamond flatted on its other side and cutting in the opposite direction can be used. The flatted part of the diamond is used only at the time of cutting steps. In addition to the sharp or steep edges to the steps, the flatted diamond can give the advantages of lower diamond wear and smoother optical surfaces between the steps. The step heights multiplied by the refractive index difference between the lens material and the tear film provide an optical path difference substantially equivalent to one wavelength of light (close to the centre of the human visual response) of some integral multiple of one wavelength.

What we claim is:

1. A method of fitting rigid gas permeable contact lenses to prescription, comprising the steps of (1) providing a set of lenses of differing BCOR values, the BCOR value being the Back Surface Central Optical Radius which is the distance from a rear surface of the lens to a centre of curvature of that rear surface, but the same optical corrective power, (2) fitting a patient with a lens and determining its BCOR value, (3) determining the corrective optical prescription required for that patient and (4) supplying the patient with a lens having the determined BCOR value, and the corrective prescription, the lens supplied having been manufactured in the same geometry and fitting characteristics as the lens from the set used in fitting, and adjusted to the correct prescription power from the basic power by diffractive means.

2. The method according to claim 1 wherein said diffractive means are introduced into the lens by cutting steps into the surface of said lens with a flatted diamond wherein said flatted diamond is characterized as having a shape such that when the diamond is plunged into the surface of the lens to provide a diffractive zone, its trailing edge leaves a step with a gradient steeper than 45%.

3. The method according to claim 2 wherein said steps have step heights which when multiplied by the refractive index difference between the lens material and the tear film provide an optical path difference substantially equivalent to one wavelength of light close to the center of the human visual response or some integral multiple thereof.

4. A method of fitting rigid gas permeable contact lenses to prescription, comprising (1) using a set of lenses of differing BCOR values, the BCOR value being the Back Surface Central Optical Radius which is the distance from a rear surface of the lens to a centre of curvature of that rear surface but identical refractive optical corrective powers to determine, based on comfort, the required BCOR value, (2) determining the optical power adjustment to the lens from the set of lenses required to correct for the prescription of the patient and (3) using an identical lens to the lens selected from the set of lenses and providing to said lens diffractive means to adjust the optical corrective power to be correct for the patient.

5. A method as claimed in claim 4, wherein the diffractive means provides a positive optical power to add to the base refractive power of the lens.

6. A method as claimed in claim 4, wherein the diffractive means provides a negative optical power to subtract from the base refractive power of the lens.

7. A method as claimed in claim 4, in which the contact lenses are manufactured in two stages, a first stage wherein the lenses have a purely refractive optical corrective power and a second stage in which the diffractive power is provided to adjust the lens to the correct optical corrective power by diffractive means.

8. A method as claimed in claim 4, wherein the set of lenses used for fitting the patient comprises two half sets, a first half set of positive refractive power and a second half set of negative refractive power.

9. A method as claimed in claim 4, in which the set of lenses, or a half set thereof, have a positive refractive power of +3.00 Dioptres.

10. A method as claimed in claim 4, in which the set of lenses, or a half set thereof, have a negative refractive power of −3.00 Dioptres.

11. A single vision rigid gas permeable lens in which the power of the lens is determined by a combination of basic refractive power arising from the shape, curvature and material of the lens, and diffractive power, the diffractive power being produced by cutting one of the lens surfaces so as to provide a diffractive means with steps on that surface, the cutting being carried out with a flatted diamond and the diffractive means being one in which the step heights when multiplied by the refractive index difference between the lens material and the tear film provide an optical path difference substantially equivalent to one wavelength of light close to the center of the human visual response or some integral multiple thereof wherein said flatted diamond is characterized as having a shape such that when the diamond is plunged into the surface of the lens to provide a diffractive zone, its trailing edge leaves a step with a gradient steeper than 45%.

12. A set of rigid gas permeable contact lenses for use in supplying lenses to a patient's individual prescription, which said set of lenses (the supply set) being manufactured so as to have available a range of fitting characteristics substantially the same as that available in a set of lenses (the fitting set) used in determining the patient's prescription, the supply set differing from the fitting set in that their overall power value is determined by a combination of basic refractive power arising from the shape, curvature and material of the lens, and diffractive power.

* * * * *